(12) United States Patent
Sutton et al.

(10) Patent No.: US 11,934,376 B2
(45) Date of Patent: *Mar. 19, 2024

(54) PERSONAL INFORMATION DATABASE MODIFICATION AND MONITORING

(71) Applicant: ZenPayroll, Inc., San Francisco, CA (US)

(72) Inventors: Michael Kelly Sutton, San Francisco, CA (US); Stephen Walter Hopkins, San Francisco, CA (US); Matthew Charles Wilde, San Francisco, CA (US); Alexander Scott Gerstein, San Francisco, CA (US); Julia Hara Chin Lee, San Francisco, CA (US); Michael Ryan Nierstedt, Brooklyn, NY (US); Nicholas Giancarlo Gervasi, Walnut Creek, CA (US); Matan Zruya, San Francisco, CA (US); Robert Douglas Gill, Jr., Alameda, CA (US); Bria Nicole Fincher, Oakland, CA (US); Ningjing Su, San Francisco, CA (US); Ryan Kwong, San Francisco, CA (US); Sheng Xiang Lei, San Bruno, CA (US); Ketki Warudkar Duvvuru, Mountain View, CA (US)

(73) Assignee: ZENPAYROLL, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,249

(22) Filed: Mar. 29, 2023

(65) Prior Publication Data
US 2023/0237042 A1    Jul. 27, 2023

Related U.S. Application Data (63) Continuation of application No. 17/897,572, filed on Aug. 29, 2022, now Pat. No. 11,645,260, which is a
(Continued)

(51) Int. Cl.
*G06F 16/00* (2019.01)
*G06F 3/0482* (2013.01)
(Continued)

(52) U.S. Cl.
CPC .......... *G06F 16/235* (2019.01); *G06F 3/0482* (2013.01); *G06F 9/542* (2013.01);
(Continued)

(58) Field of Classification Search
CPC .. G06F 16/235; G06F 16/2365; G06F 16/168; G06F 9/542; G06F 3/0482; G06Q 40/10
See application file for complete search history.

(56) References Cited

U.S. PATENT DOCUMENTS

| | | | | |
|---|---|---|---|---|
| 7,941,351 B1 * | 5/2011 | Rosenfeld | ............... | G06Q 40/12 705/30 |
| 8,706,580 B2 * | 4/2014 | Houseworth | .......... | G06Q 40/00 705/31 |

(Continued)

OTHER PUBLICATIONS

United States Office Action, U.S. Appl. No. 17/204,281, dated Jun. 29, 2022, 11 pages.
(Continued)

*Primary Examiner* — Jared M Bibbee
(74) *Attorney, Agent, or Firm* — Fenwick & West LLP (57) ABSTRACT

A database management engine provides a user interface that allows users to access and modify employee information in a database. The database includes entries for employees, and each database entry includes identifying information about the associated employee. A user can request to
(Continued)

modify data within database entries, for instance in order to update information associated with an employee. Responsive to the request, the database management engine identifies liabilities associated with the database modification stemming from associated tax laws. Based on the identified tax liabilities, the engine computes the aggregate tax liability owed by the employer and/or employee. Before modifying a database entry, the engine modifies the user interface to include interface elements detailing the computed aggregate tax liability. The user explicitly can be required to confirm the database modification in view of the aggregate tax liability. Once a user gives explicit confirmation, the engine modifies the database entry.

20 Claims, 4 Drawing Sheets

Related U.S. Application Data continuation of application No. 17/204,281, filed on Mar. 17, 2021, now Pat. No. 11,461,306, which is a continuation of application No. 16/552,795, filed on Aug. 27, 2019, now Pat. No. 10,983,979, which is a continuation of application No. 16/386,005, filed on Apr. 16, 2019, now Pat. No. 10,437,811.

(51) Int. Cl.
    *G06F 9/54*     (2006.01)
    *G06F 16/16*     (2019.01)
    *G06F 16/23*     (2019.01)
    *G06Q 40/10*     (2023.01)

(52) U.S. Cl.
    CPC ........ *G06F 16/168* (2019.01); *G06F 16/2365* (2019.01); *G06Q 40/10* (2013.01)

(56) References Cited

U.S. PATENT DOCUMENTS

| | | | | |
|---|---|---|---|---|
| 2002/0022982 A1* | 2/2002 | Cooperstone | ......... | G06Q 10/10 705/1.1 |
| 2002/0049617 A1* | 4/2002 | Lencki | ......... | G06Q 30/06 705/4 |
| 2002/0107698 A1* | 8/2002 | Brown | ......... | G06Q 40/12 709/202 |
| 2002/0184125 A1* | 12/2002 | Cirulli | ......... | G06Q 40/10 705/26.1 |
| 2003/0229522 A1* | 12/2003 | Thompson | ......... | G06Q 40/00 705/348 |
| 2005/0154658 A1* | 7/2005 | Bove | ......... | G06Q 40/025 705/35 |
| 2012/0036053 A1* | 2/2012 | Miller | ......... | G06Q 40/02 705/31 |
| 2012/0197759 A1* | 8/2012 | Neely | ......... | G06Q 30/0613 705/26.41 |
| 2013/0054780 A1* | 2/2013 | Bade | ......... | H04L 43/08 709/224 |
| 2013/0198047 A1* | 8/2013 | Houseworth | ......... | G06Q 40/123 705/31 |
| 2014/0297616 A1* | 10/2014 | Zhao | ......... | G06Q 10/1053 707/708 |
| 2014/0316955 A1* | 10/2014 | Ashurex | ......... | G06Q 40/123 705/31 |
| 2015/0304169 A1* | 10/2015 | Milman | ......... | H04L 41/0823 709/220 |
| 2016/0026364 A1* | 1/2016 | Dziuba | ......... | G06Q 10/1057 715/835 |
| 2016/0092994 A1* | 3/2016 | Roebuck | ......... | G06Q 40/123 705/31 |
| 2016/0162789 A1* | 6/2016 | Carvajal | ......... | G06Q 10/105 706/11 |
| 2016/0292964 A1* | 10/2016 | Flaherty | ......... | H04L 67/52 |
| 2017/0161833 A1* | 6/2017 | Porth | ......... | G06Q 10/1053 |
| 2019/0012745 A1* | 1/2019 | Ampe | ......... | G06Q 10/10 |
| 2020/0020046 A1* | 1/2020 | Selvaraj | ......... | G06F 40/40 |
| 2021/0233181 A1* | 7/2021 | Bubalo | ......... | G06F 40/289 |

OTHER PUBLICATIONS

United States Office Action, U.S. Appl. No. 17/204,281, dated Apr. 11, 2022, 13 pages.
United States Office Action, U.S. Appl. No. 17/204,281, dated May 31, 2022, 11 pages.
United States Office Action, U.S. Appl. No. 17/204,281, dated May 16, 2022, 10 pages.
United States Office Action, U.S. Appl. No. 16/552,795, dated Dec. 10, 2020, 8 pages.
United States Office Action, U.S. Appl. No. 17/897,572, dated Dec. 23, 2022, 8 pages.

* cited by examiner

PERSONAL INFORMATION DATABASE MODIFICATION AND MONITORING

CROSS REFERENCE TO RELATED APPLICATIONS

This application is a continuation of U.S. application Ser. No. 17/897,572, filed Aug. 29, 2022, now U.S. Pat. No. 11,645,260, which is a continuation of U.S. application Ser. No. 17/204,281, filed Mar. 17, 2021, now U.S. Pat. No. 11,461,306, which is a continuation of U.S. application Ser. No. 16/552,795, filed Aug. 27, 2019, now U.S. Pat. No. 10,983,979, which is a continuation of U.S. patent application Ser. No. 16/386,005 filed Apr. 16, 2019, now U.S. Pat. No. 10,437,811, which is incorporated herein by reference in its entirety for all purposes.

BACKGROUND

This description generally relates to human resource database systems and specifically to identifying and presenting potential penalties and liabilities based on user modifications to a database.

In current human resource database systems, when a customer requests to modify user information, database modifications must be manually entered. However manual entry is prone to error and may be forgotten or neglected. Further, a single database modification to a user's data may not always fix the problem it is intended to fix. As a result, current human resource database systems are not able to rectify downstream liability changes from a single update in user information. Further, manual entry is often linked with increased labor costs and penalties, which customers are expected to absorb. Finally, changing a user's information may result in liabilities and penalties that aren't always apparent prior to updating the database.

SUMMARY

A database management engine allows users to easily and automatically make retroactive modifications to database entries in a human resource database. Automating the modifications to a human resource database can reduce penalties and liabilities incurred by an entity associated with the database by reducing database modification delays caused by manual entry of such modification. The database management engine is also able to automatically identify exemptions, deductions, rebates, etc., available to an employer or employee associated with the database. Further, the database management engine allows users to modify database entries without removing any information from the human resource database.

The database management engine provides a user interface that allows users to access and modify employee information in a database. The database includes entries for each employee of an employer, and each database entry includes identifying information about the associated employee. For example, the database entry may include data describing a geographic location of a workplace of an employee. Users can access individual database entries of the database through various interactive or data entry elements of the user interface. The database management engine receives requests from users to retrospectively modify database entries in the database. For example, a user may request to modify data in a database entry to update the geographic location of the workplace of a corresponding employee who moved during a now-closed financial quarter.

Responsive to the request, the database management engine identifies one or more tax liabilities of the database modification. The one or more tax liabilities may be identified based on federal, state, and local tax laws, information in the employee's database entry, and information about the employer. Based on the one or more identified tax liabilities, the database management engine computes the aggregate tax liability owed by the employer and/or employee. The database management engine may also compute any tax penalties owed by the employee and/or employer, amendments that need to be filed, and the like.

Before modifying the data in the database entry, the database management engine modifies the user interface to detail the computed aggregate tax liability associated with the database modification. The user interface may also detail other effects of the database modification (tax penalties, debits, refunds, exemptions, etc.) and projected effects if additional database modifications are made to the same or different database entries in the database. The database management engine also requests that the user explicitly confirm the requested database modification to the data in the database entry.

Once a user has given explicit confirmation, the database management engine modifies the data in the database entry. The database management engine may also propagate the database modification throughout the database. For example, the database management engine may update employer database entries in the database and file requisite amendments or tax documents on behalf of the employee and/or employer.

The figures depict various example embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

System Overview

Figure 1:
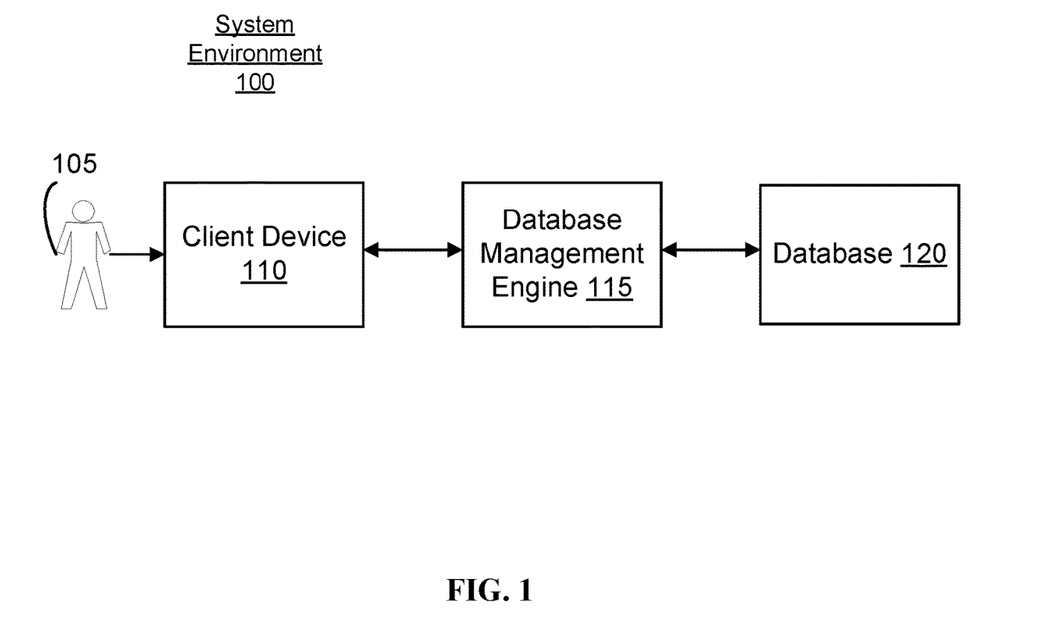
FIG. 1 illustrates a diagram of a system environment of a database management engine, according to one embodiment.

FIG. 1 illustrates a diagram of a system environment 100 of a database management engine 115, according to one embodiment. The system environment 100 shown by FIG. 1 includes a user 105, a client device 110, a database management engine 115, and a database 120. In alternative configurations, different and/or additional components may be included in the system environment 100.

A user 105 of the database management engine 115 is an individual or entity associated with an organization. Organizations may include schools or universities, businesses, non-profits, government agencies, and the like. Each organization has one or more employees. A user 105 can use the database management engine 115 to manage employee information, in particular payroll and tax-related information.

The client devices 110 are one or more computing devices capable of receiving user input as well as transmitting and/or receiving data via a network. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via a network. In one embodiment, a client device 110 executes an application allowing a user of the client device 110 to interact with the database management engine 115. For example, a client device 110 executes a browser application or native application to enable interaction between the client device 110 and the database management engine 115 via a network. In another embodiment, a client device 110 interacts with the database management engine 115 through an application programming interface (API) running on a native operating system of the client device 110, such as IOS® or ANDROID™.

The client devices 110 are configured to communicate via a network, which may include any combination of local area and/or wide area networks, using both wired and/or wireless communication systems. In one embodiment, a network uses standard communications technologies and/or protocols. For example, a network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network may be represented using any suitable format, such as hypertext markup language (HTML) or extensible markup language (XML). In some embodiments, all or some of the communication links of a network may be encrypted using any suitable techniques.

The database management engine 115 enables a user 105 to manage information of employees or other personnel or individuals associated with an organization. For instance, the database management engine 115 enables a user 105 to amend and update employee information stored by the database 120. A user 105 may access and modify information stored in the database 120 through an interface populated by the database management engine 115 and displayed by a client device 110. The database management engine 115 is described in detail below.

Each employee of an organization is associated with an entry in the database 120. A user 105 creates and modifies database entries of the database 120 using the database management engine 115. A database entry includes declarative information about the employee that was provided by the employee, for instance at the time of hiring the employee. Each database entry includes multiple data fields, each describing one or more attributes of the corresponding employee. Examples of information stored in a database entry include (but are not limited to) biographic information, demographic information, geographic information (such as state of employment and/or home address), payroll history, and other types of descriptive information, such as information related to tax filings (e.g., salary, employer, citizenship status, number of dependents, work location, deductions, and the like). In some embodiments, database entries also include documents filled-in by the employee or on behalf of the employee, such as documents related to benefits selections, tax filings, equity, etc. In some embodiments, a database entry in the database may also maintain references to actions made to the corresponding database entry. For example, the database entry may include a log of changes made to a database entry, including changes to payroll, workplace location, citizenship, and corresponding metadata (e.g., time, date, location, author, etc.)

In some embodiments, the database 120 also includes database entries for the organization itself. Information stored in an entity database entry may include payroll history, number of employees, location of company holdings, benefits provided to each employee (health care, retirement plans, equity, etc.). The database 120 may also include information about organizational preferences and security settings. For example, an organization database entry may include data fields corresponding to payroll frequency, when database modifications can be made to database entries, who can modify database entries, when bonuses are given and/or received, etc.

Data Management Engine

The database management engine 115 manages database entries in the database 120, and automatically amends and updates the database 120 when database modifications to database entries are made. For example, the database management engine 115 is able to amend discrepancies in the database 120 when a user 105 retrospectively modifies a database entry in a way that affects the activities of a payroll system during a financial quarter. Modifications to database entries may include reversing and rerunning payrolls, rate changes, address changes, exemption changes, unreported hirings, unreported terminations, and the like. Payroll system activities may include computing tax liabilities and penalties owed to affected jurisdictions.

When a user 105 makes a request to modify a database entry that affects payroll, there are two timelines associated with the requested database modification. If the payroll activities during a financial quarter change, the retrospective view of the financial quarter will also change. The first timeline ("T1") includes the original configuration of the quarter's activities (i.e., before a database modification to a database entry is made) and the second timeline ("T2") includes the new configuration of the quarter's activities (i.e., after the database modification to the database entry is made). Upon making the requested database modification, a payroll amendment that reconciles the timelines can be identified and processed. In some embodiments, payroll amendments cannot modify previously computed payrolls, thus necessitating an additional payroll be entered to reconcile the timelines. Examples of payroll amendments include debits, refunds, adjusted tax rates, and new state registrations. Liabilities and penalties resulting from the database modifications are also computed. Before a database modification requiring a payroll amendment is made to a database entry, payroll amendments, liabilities and penalties are presented to the user 105 on a user interface displayed by the client device 110 so that the user 105 can see the projected effect of the database modification. In some embodiments, the user 105 must explicitly confirm that the database modification should be entered into the database after viewing the projected payroll effect of the database modification on the organization. The user 105 may also be required to explicitly confirm that payroll amendments should be entered and outstanding debits (such as additional tax liabilities) should be paid, for instance before the database entry is modified.

For example, a user 105 may wish to enter a backdated address for an employee that transferred from a company's California office to its New York office between a first and second payroll of a previous financial quarter. If the previous financial quarter is closed, when the database modification is made, the quarter's filings will no longer be accurate. In this example, the filing does not account for the taxes owed to New York and the taxes overpaid to California in the second payroll of the previous financial quarter. Therefore, a payroll amendment needs to be filed to reconcile between a timeline associated with the as-filed financial quarter, T1, and a timeline associated with the financial quarter that includes the address change, T2. The database management engine 115 identifies the nature of the database modification as a backdated address change, identifies the payroll amendment that would reconcile T1 and T2, and presents the database modification and payroll amendment to the user 105 on the user interface. In this example, the payroll amendment may include the amount taxes owed to New York, the refund owed to the employee and/or employer for overpaying taxes in California, New York state registrations, and penalties and interests owed for not filing the address change on-time. After viewing the payroll amendments, the user 105 can decide whether or not to proceed with the database modification, and the database modifications aren't entered until the user 105 explicitly confirms that the database modification should be entered.

Figure 2:
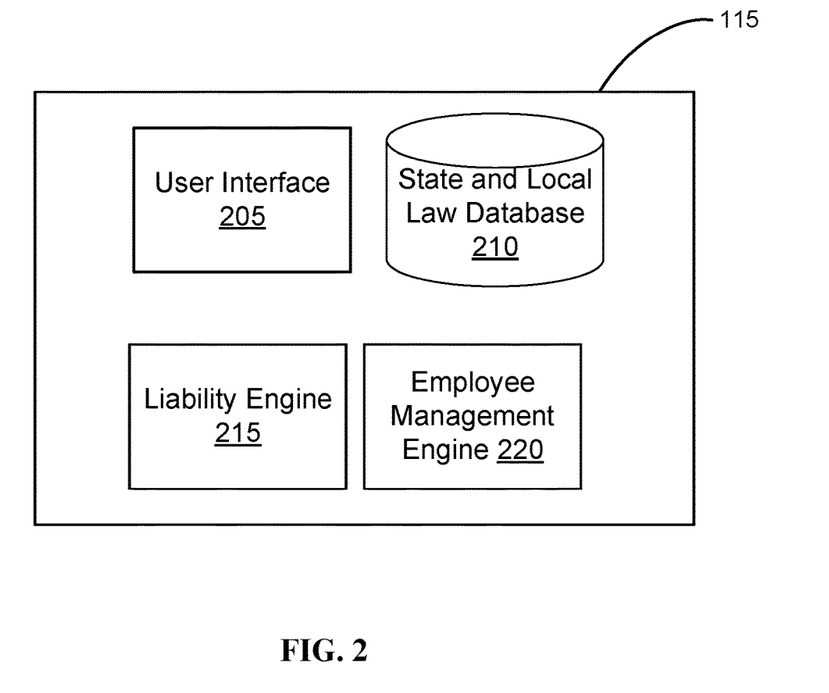
FIG. 2 is a block diagram of an architecture of the database management engine, according to one embodiment.

FIG. 2 is a block diagram of an architecture of the database management engine 115, according to one embodiment. The database management engine 115 shown in FIG. 2 includes a user interface 205, a state and local law database 210, a liability engine 215, and an employee management engine 220. In other embodiments, the database management engine 115 may include additional, fewer, or different components for various applications. Conventional components such as security functions, load balancers, failover servers, management and network operations consoles, and the like are not shown so as to not obscure the details of the system architecture.

The user interface 205 allows a user 105 to access, modify, and create database entries in the database 120 using various elements of the user interface 205. The user interface 205 also allows a user 105 to view and accept liabilities, penalties, and payroll amendments identified by the liability engine 215. In some embodiments, to modify a database entry in the database 120, a user 105 must view the projected liabilities, penalties, and requisite payroll amendments resulting from the requested database modification, and must explicitly confirm the database modification in view of the requested database modification. For example, the user 105 may have to trigger a user command, provide security information (e.g., a pin number, passcode, etc.), etc., before the database modification and payroll amendments are entered.

As a user 105 makes a request to modify a database entry, the requested database modifications are sent to the liability engine 215 and/or employee management engine 220. The liability engine 215 computes the impacts of the database modification on the database 120, which are displayed on the user interface 205. The liability engine 215 is discussed in further detail below. The employee management engine 220 completes and logs any database modifications made to a database entry, as discussed in further detail below.

The state and local law database 210 stores federal, state, and/or local tax laws of each jurisdiction an organization or employee works and lives in including, but not limited to, available tax deductions in a particular jurisdiction, available tax refunds in a particular jurisdiction, and tax rates/tax brackets in a particular jurisdiction. The state and local law database 210 may be connected to a network to import tax laws from third-party software systems, third-party databases, and the like. The state and local law database 210 may be updated automatically when new tax laws are put into effect or existing tax laws are amended. The state and local law database 210 may also be updated at a frequency set by the user 105 (e.g., every month, quarter, year, etc.) or by a trigger event (such as a request from the user 105, a database administrator, running payroll, and the like). In some embodiments, the state and local law database 210 includes other laws that are used to identify and calculate liabilities. The state and local law database 210 may also stores forms relevant to requisite payroll amendments identified by the liability engine 215. For example, the state and local law database 210 may store templates of new state registration forms, tax amendment forms, tax return forms, and the like.

The liability engine 215 computes the projected liabilities and penalties that result from database modifications made to individual database entries or to the entire database 120. The liability engine 215 also identifies payroll amendments necessary to reconcile previously-run payrolls, true-up taxes owed/overpaid by the organization or employee, and debit penalties and interests owed for backdated database modifications. Examples of payroll amendments may include: filing amendments to tax documents, paying debits, issuing refunds, filing new state registrations, etc. To compute the projected liabilities and penalties and identify necessary payroll amendments, the liability engine 215 queries the state and local law database 210 using information associated with the requested database modification (e.g., such as an employee's old address and new address) to identify the relevant liabilities and penalties (and also available tax credits and refunds) associated with the requested database modification.

The liability engine 215 also computes the aggregate liabilities and penalties owed when more than one change is made to a database entry, when multiple changes are made to more than one database entry, when an organization changes their payroll preferences (e.g., from biweekly to twice-monthly), and the like. The liabilities, penalties, and requisite payroll amendments associated with the modified database entry are displayed to the user 105 on the user interface 205. In some embodiments, the liability engine 215 also identifies tax exemptions, deductions, rebates, etc., available to the organization or employee.

The employee management engine 220 modifies database entries in the database based on the requested database modification. The employee management engine 220 also enters payroll amendments identified by the liability engine 215. To do this, the employee management engine 220 receives the computed liabilities, penalties, and requisite payroll amendments identified by the liability engine 215 and completes necessary forms for the payroll amendment (e.g., new state registration, exemption forms, tax amendments, etc.), files the payroll amendments, trues-up debts owed by the organization, etc. Completed payroll amendments are sent to the user interface 205 to be displayed by the user 105. The user 105 can view and share the payroll amendments via the user interface 205. In some embodiments, the user 105 can edit payroll amendments using interactive or data entry elements of the user interface 205.

The employee management engine 220 also monitors and logs database modifications made to database entries. Logs may include metadata associated with the database modification, such as a time and date of the database modification, an author of the database modification, information identifying or associated with the modified database entry, a reason for the database modification, a location from which the database modification is requested, etc.

The employee management engine 220 also propagates the database modification throughout the database 120. For example, the employee management engine 220 may recalculate payrolls with the database modifications and update total liabilities and penalties owed by the organization. In some embodiments, the employee management engine 220 may propagate the database entry throughout the database 120 only after the database management engine 115 receives explicit confirmation from the user 105 to modify the database entry in the database 120. In other embodiments, once a database entry is modified, the employee management engine 220 automatically propagates the database modification throughout the database, modifying database entries in the database affected by the database modification to the database entry.

Figure 3A:
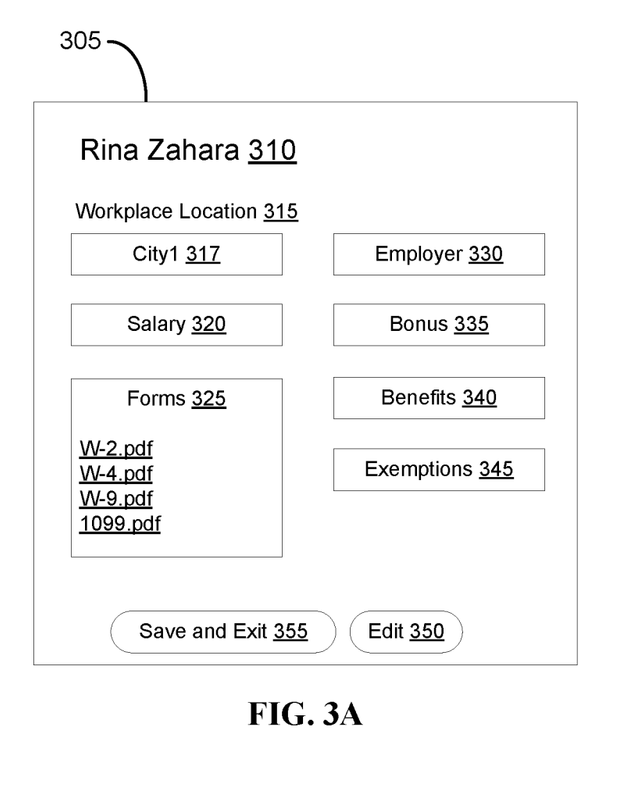
FIGS. 3A-3C illustrate a process of a user modifying an entry in a database managed by the database management engine, according to one embodiment.

FIG. 3A illustrates an example of a user interface of a database management engine 115 displaying database information included within a database entry 305, according to one embodiment. As previously discussed, a database entry 305 is an object with multiple data fields, each including information about the employee. The database entry 305 shown includes a name field, e.g., Rina Zahara 310, a workplace location field 315, a salary field 320, a forms field 325, an employer field 330, a bonus field 335, a benefits field 340, and an exemptions field 345. The workplace location field 315 indicates the employee works in City1 317. The forms field 325 includes tax- and payroll-related forms. For example, the forms field 325 may include a W-2 form, a W-4 form, a W-9 form, a 1099 form, etc. The employer field includes information about the employee's employer. Information may include a particular subsidiary of the organization the employee works for, the department and/or position of the employee, status of the employee, etc. In some embodiments, the employer field 330 may be directly linked to an employer database entry in the database 120 that can be accessed through the user interface 205. The bonus field 335 may include an amount and time a bonus was received, upcoming bonuses, etc. The benefits field 340 includes information about the employee's benefits. This may include the insurance coverage the employer provides, insurance plan selections, retirement selections, etc. The exemptions field 345 includes exemptions the employee is eligible for. Examples of examples include: income exemptions, individual exemptions, property exemptions, etc. The exemptions field 345 may also include information related to the employee's exemption eligibility. This can include citizenship, number of dependents, age, etc. In alternative embodiments, different, fewer, or more data fields are included in database entries. The user interface may include radio buttons that the user 105 can select to edit a database entry, e.g., edit button 350, or save the database entry 305 and exit the interface displaying the database entry 305, e.g., save and exit button 355.

Figure 3B:
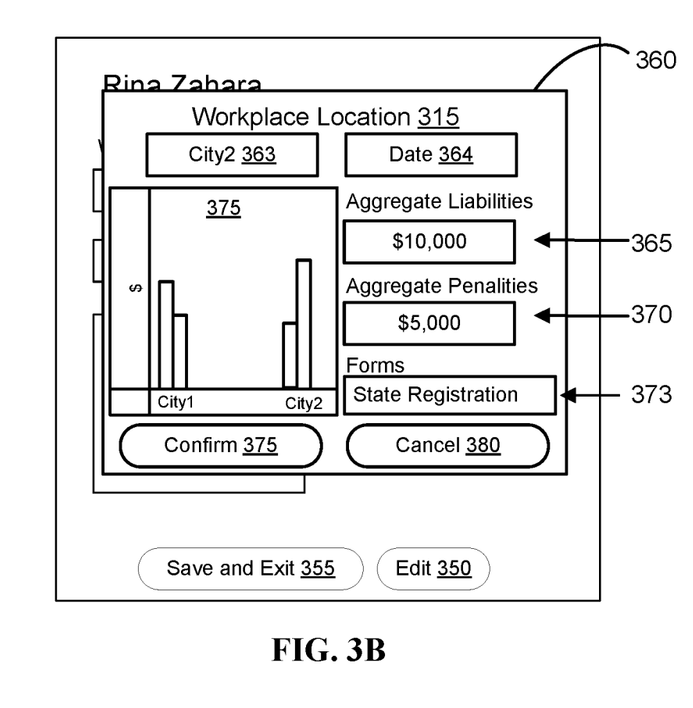

FIG. 3B illustrates a user interface 205 displaying the projected effects of a database modification on an entry in the database 120. A user 105 may request to modify one or more fields in the database entry 305 by selecting the edit button 350. The projected effects of the database modification are displayed to the user 105 on an additional user interface element 360. In some embodiments, when a user 105 selects a data field to modify, the additional user interface element 360 is displayed to the user 105. In other embodiments, the additional user interface element 360 is displayed to the user 105 after the user 105 enters any database modifications, upon request from the user 105 to view the project effects of the database modification, after the database modification is processed by the database management engine 115, and the like. In the example shown in FIG. 3B, a user 105 is requesting to modify the workplace location data field 315 by replacing City1 317 with City2 363. In some embodiments, a user 105 may be prompted to provide additional information for certain database modifications. For example, the user 105 may be asked for the effective date 364 of the database modification, which will be used by the database management engine 115 to calculate liabilities and penalties associated with the database modification. In other examples, a user 105 may be asked for the effective date of a salary change, a new hire, an eligible exemption, a rebate, etc.

Once the liability management engine 215 receives an updated value for a data field, it computes any corresponding aggregate liabilities 365 and/or aggregate penalties 370, and displays them on the additional user interface element 360 of the user interface 205. The user interface element 360 may also display a graph 375 of the effects of the database modification on the organization. For example, the graph 375 may display the tax rates of different jurisdictions, penalties associated with backdated address changes, fees associated with moving an employee from geographic location to another, net gains or losses, money saved in rebates and/or exemptions, and the like. The interface element 360 may also display any forms 373 that need to be updated or created for the employee or organization. After the user 105 reviews the liabilities and penalties associated with the database modifications, the user 105 confirms the database modifications in view of the displayed liabilities and penalties caused by the database modifications, for instance by selecting the confirm interface element 375. Likewise, the user 105 may cancel the database modification, e.g., by selecting cancel 380.

Figure 3C:
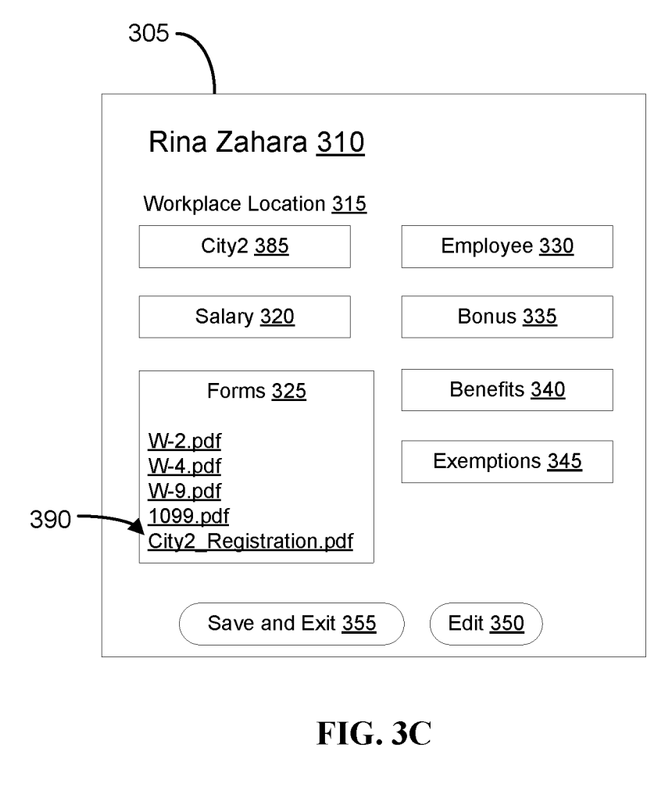

FIG. 3C illustrates a modified database entry 305, according to one embodiment. The database entry 305 now includes City2 385 as the workplace location field 315, and the forms field 325 now includes a state registration form 390 for City2. The user 105 may continue to edit the database entry 305 by selecting the edit button 350, or the user 105 may save the modified database entry by selecting the save and exit button 355.

Figure 4:
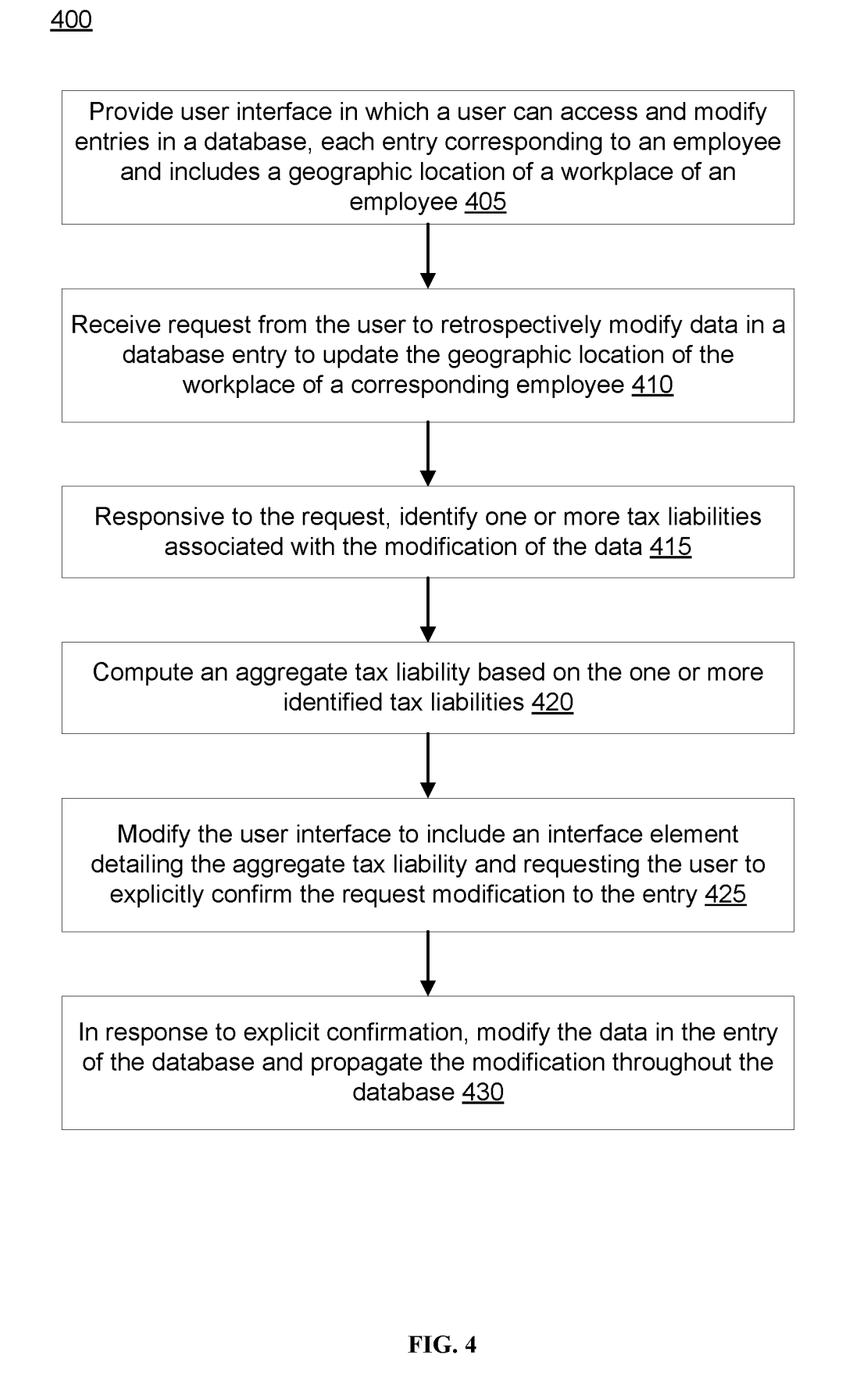
FIG. 4 is a flow chart illustrating a method of modifying an entry in the database by the database management engine, according to one embodiment.

FIG. 4 is a flow chart illustrating a method 400 of modifying a database entry in the database by the database management engine 115, according to one embodiment. A database management engine 115 provides 405 a user interface 205 in which a user 105 can access and modify database entries in a database 120. In some embodiments, each database entry corresponds to an employee and includes a geographic location of a workplace of an employee. The database management engine 115 receives 410 a request from the user 105 to retrospectively modify data in a database entry in order to update the geographic location of the workplace of a corresponding employee. For example, the user 105 may want to enter a backdated address of an employee who transferred from a first geographic location to a second geographic location.

Responsive to the request from the user 105, the database management engine 115 identifies 415 one or more tax liabilities associated with the requested database modification of the data. The database management engine 115 computes 420 an aggregate tax liability based on the one or more identified tax liabilities. In some embodiments, the database management engine 115 also identifies and computes one or more penalties, exemptions, or rebates based on the database modification. The database management engine 115 modifies 425 the user interface 205 to include an interface element detailing the aggregate tax liability and requesting the user 105 to explicitly confirm the requested database modification to the database entry. In response to explicit confirmation, the database management engine 115 modifies 430 the data in the database entry and propagates the database modification throughout the database 120. In some embodiments, the database management engine 115 completes and files payroll amendments on behalf of the user 105. For example, the database management engine 115 may debit the user 105 any liabilities owed to one or both of the geographic locations, may prepare and file tax documents and payroll amendments, and the like.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A method comprising:
providing for display a user interface in which a user can access and modify a database, the database containing a plurality of entries each corresponding to an employee;
receiving a request from the user to retrospectively modify data associated with a characteristic of an employee in an entry of the database corresponding to the employee, wherein modifying the characteristic of the employee comprises changing a benefit exercised by the user;
before modifying the data in the entry of the database, modifying the user interface to include an interface element that displays the change in the characteristic that will result from the data being modified and to include links to forms specific to the benefit exercised by the user that must be modified or executed in order for the change in the characteristic to take effect, and requesting the user explicitly confirm the requested modification to the data in the entry of the database; and
in response to explicit confirmation from the user, modifying the data in the entry of the database and propagating the modification throughout the database.

2. The method of claim 1, wherein the user interface element details one or more of a net gain, a net loss, an exemption, or a rebate associated with the modification of the data.

3. The method of claim 1, further comprising:
automatically preparing and filing one or more forms associated with the modification with a corresponding governmental agency.

4. The method of claim 1, further comprising:
identifying one or more actions required by the user before the data can be modified;
autogenerating forms associated with the one or more actions; and
providing the forms for display on the user interface such that the user can access and complete the forms.

5. The method of claim 1, wherein the benefit exercised by the user comprises one or more of: a change in insurance coverage, a change in insurance plan or plan selection, and a change in retirement selection.

6. The method of claim 1, wherein propagating the modification throughout the database further comprises:
identifying a tax document to be amended in response to the modification;
amending the tax document based on the modification; and
filing the amended tax document based on the modified entry in the database.

7. The method of claim 1, wherein propagating the modification throughout the database further comprises:

calculating a set of penalties associated with the modification owed to a jurisdiction; and redistributing funds allocated to the jurisdiction based on the set of penalties.

8. A non-transitory computer-readable storage medium containing executable instructions that, when executed by a hardware processor, cause the hardware processor to perform steps comprising:

providing for display a user interface in which a user can access and modify a database, the database containing a plurality of entries each corresponding to an employee;

receiving a request from the user to retrospectively modify data associated with a characteristic of an employee in an entry of the database corresponding to the employee, wherein modifying the characteristic of the employee comprises changing a benefit exercised by the user;

before modifying the data in the entry of the database, modifying the user interface to include an interface element that displays the change in the characteristic that will result from the data being modified and to include links to forms specific to the benefit exercised by the user that must be modified or executed in order for the change in the characteristic to take effect, and requesting the user explicitly confirm the requested modification to the data in the entry of the database; and in response to explicit confirmation from the user, modifying the data in the entry of the database and propagating the modification throughout the database.

9. The non-transitory computer-readable storage medium of claim 8, wherein the user interface element details one or more of a net gain, a net loss, an exemption, or a rebate associated with the modification of the data.

10. The non-transitory computer-readable storage medium of claim 8, wherein the instructions, when executed, cause the hardware processor to perform further steps comprising:

automatically preparing and filing one or more forms associated with the modification with a corresponding governmental agency.

11. The non-transitory computer-readable storage medium of claim 8, wherein the instructions, when executed, cause the hardware processor to perform further steps comprising:

identifying one or more actions required by the user before the data can be modified;

autogenerating forms associated with the one or more actions; and providing the forms for display on the user interface such that the user can access and complete the forms.

12. The non-transitory computer-readable storage medium of claim 8, wherein the benefit exercised by the user comprises one or more of: a change in insurance coverage, a change in insurance plan or plan selection, and a change in retirement selection.

13. The non-transitory computer-readable storage medium of claim 8, wherein propagating the modification throughout the database further comprises:

identifying a tax document to be amended in response to the modification;

amending the tax document based on the modification; and filing the amended tax document based on the modified entry in the database.

14. The non-transitory computer-readable storage medium of claim 8, wherein propagating the modification throughout the database further comprises:

calculating a set of penalties associated with the modification owed to a jurisdiction; and redistributing funds allocated to the jurisdiction based on the set of penalties.

15. A system comprising:

a hardware processor; and a non-transitory computer-readable medium containing instructions that, when executed by the hardware processor, cause the hardware processor to perform steps comprising:

providing for display a user interface in which a user can access and modify a database, the database containing a plurality of entries each corresponding to an employee;

receiving a request from the user to retrospectively modify data associated with a characteristic of an employee in an entry of the database corresponding to the employee, wherein modifying the characteristic of the employee comprises changing a benefit exercised by the user;

before modifying the data in the entry of the database, modifying the user interface to include an interface element that displays the change in the characteristic that will result from the data being modified and to include links to forms specific to the benefit exercised by the user that must be modified or executed in order for the change in the characteristic to take effect, and requesting the user explicitly confirm the requested modification to the data in the entry of the database; and in response to explicit confirmation from the user, modifying the data in the entry of the database and propagating the modification throughout the database.

16. The system of claim 15, wherein the user interface element details one or more of a net gain, a net loss, an exemption, or a rebate associated with the modification of the data.

17. The system of claim 15, wherein the instructions, when executed, cause the hardware processor to perform further steps comprising:

automatically preparing and filing one or more forms associated with the modification with a corresponding governmental agency.

18. The system of claim 15, wherein the instructions, when executed, cause the hardware processor to perform further steps comprising:

identifying one or more actions required by the user before the data can be modified;

autogenerating forms associated with the one or more actions; and providing the forms for display on the user interface such that the user can access and complete the forms.

19. The system of claim 15, wherein the benefit exercised by the user comprises one or more of: a change in insurance coverage, a change in insurance plan or plan selection, and a change in retirement selection.

20. The system of claim 15, wherein propagating the modification throughout the database further comprises:

identifying a tax document to be amended in response to the modification;

amending the tax document based on the modification; and filing the amended tax document based on the modified entry in the database.

\* \* \* \* \*